Dec. 29, 1925.
R. E. JONES
1,567,953
WHEEL HOLDER
Filed Oct. 18, 1924
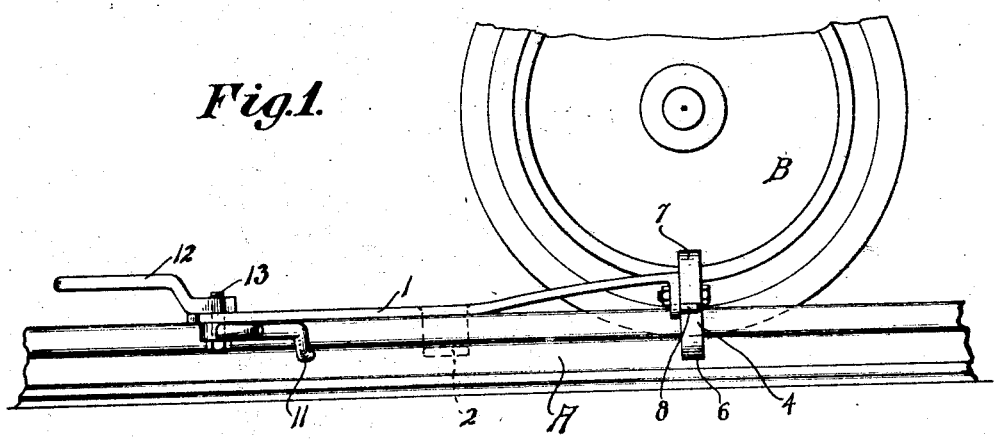
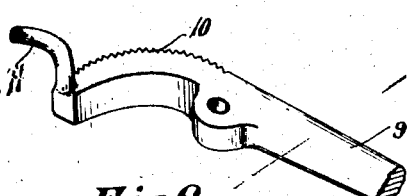
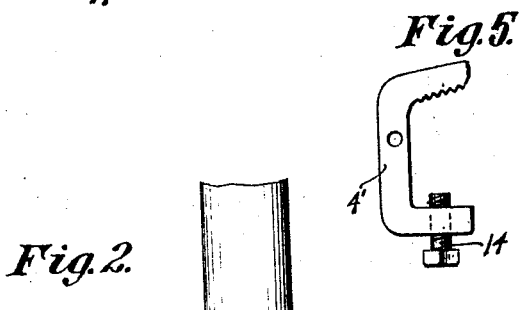
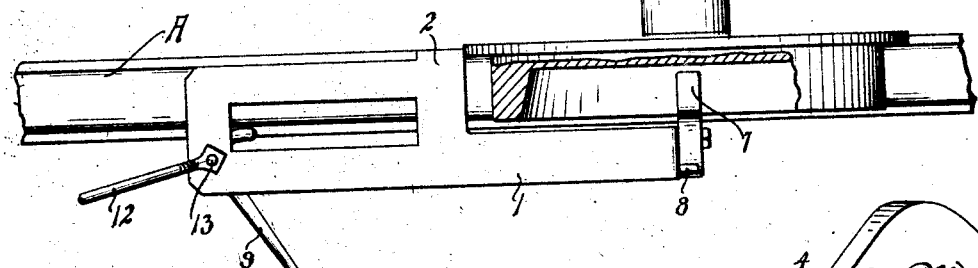
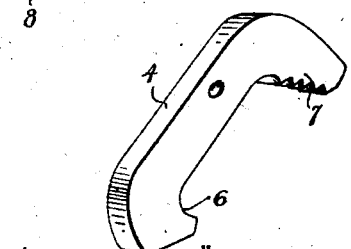
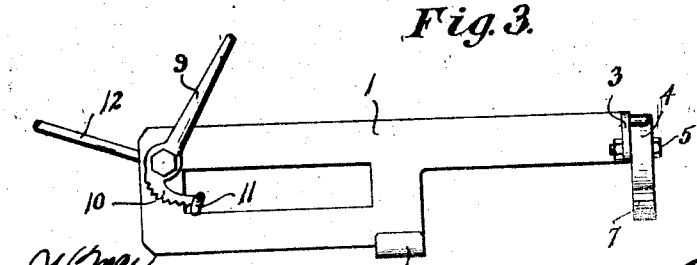
R. E. Jones,
INVENTOR
BY *Victor J. Evans*
ATTORNEY Patented Dec. 29, 1925.

1,567,953

UNITED STATES PATENT OFFICE.

RALPH E. JONES, OF TROY, MONTANA.

WHEEL HOLDER.

Application filed October 18, 1924. Serial No. 744,451.

*To all whom it may concern:*

Be it known that I, RALPH E. JONES, a citizen of the United States, residing at Troy, in the county of Lincoln and State of Montana, have invented new and useful Improvements in Wheel Holders, of which the following is a specification.

This invention relates to a clamp, the general object of the invention being to provide means for clamping a car wheel to a track rail so that the wheel can be re-brassed and which will eliminate the use of a jack shoe now in use.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which :—

Figure 1 is a view showing the invention in use as clamping a wheel to a rail.

Figure 2 is a plan view of Figure 1.

Figure 3 is a bottom plan view of the device itself.

Figure 4 is a view of the wheel engaging dog.

Figure 5 is a view of a modified form of dog.

Figure 6 is a view of the rail engaging member.

In these views, 1 indicates a plate which is provided with a bent over part at one side which forms a hook for engaging the tread of the rail A, as shown in Figures 1 and 2. One end of the plate is bent over, as at 3, and a dog 4 is pivoted to this bent over part by the bolt 5. This dog is provided with a hook 6 at one end thereof for engaging the tread of the rail and with a toothed part 7 for engaging a wheel B so that the wheel is clamped to the rail. The part of the plate to which the dog 4 is pivoted slopes upwardly from the rest of the plate, as shown in Figure 1. The bent end of the plate carries a pin 8 which limits the movement of the dog 4. A lever 9 is pivoted to the opposite end of the plate and this lever has a curved part 10 which is roughened to engage a part of the rail and which has a hooked extremity 11 for extending under the tread of the rail. A handle 12 is secured to the plate by the pin 13 which fastens the lever 9 to the plate.

In using the device the hook 2 on the plate is placed under the inner edge of the tread of the rail with the dog 4 having its hooked part 6 engaging the outer edge of the tread of the rail and the toothed part 7 engaging the inner part of the flange of the wheel. Then the lever 9 is moved to press its curved part 10 against the outer edge of the tread of the rail with the hook 11 engaging this part of the tread so that the plate is moved to cause the dog 4 to firmly grip the rail and the wheel and thus clamp the wheel to the rail. Then the brasses can be removed and new ones substituted in the usual manner.

In some cases a set screw 14 is passed through a threaded hole in the dog 4', as shown in Figure 5, this type of dog being designed for use on the wheels of coaches and tank cars.

From the foregoing it will be seen that I have provided simple means for clamping a wheel to a rail, such means taking the place of the jack shoes now in use and which give so much trouble in renewing brasses of wheels.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is :—

A wheel clamp comprising a supporting member having a hook thereon for engaging a rail, a dog pivoted to the supporting member and having a hooked part for engaging a part of the rail and a toothed part for engaging a part of the wheel, a lever pivoted to a part of the plate and having a curved part for engaging a part of the rail and having a hooked part for engaging one edge of the tread of the rail.

In testimony whereof I affix my signature.

RALPH E. JONES.